United States Patent
Kim

(10) Patent No.: US 6,191,866 B1
(45) Date of Patent: *Feb. 20, 2001

(54) LASER PRINTER CAPABLE OF AND METHOD FOR PRINTING RASTERIZED DATA OF HIGH IMAGE QUALITY

(75) Inventor: Duk-Soo Kim, Kyonggi-do (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/933,849

(22) Filed: Sep. 19, 1997

(30) Foreign Application Priority Data

Sep. 19, 1996 (KR) .................................... 96-40892

(51) Int. Cl.$^7$ .................................... G06K 15/00
(52) U.S. Cl. ........................................... 358/1.2; 358/1.17
(58) Field of Search ..................... 395/101, 102, 395/109, 114, 115, 116, 117; 347/131; 358/443, 444, 447, 448, 451, 1.1, 1.2, 1.9, 1.15, 1.16, 1.17, 1.18

(56) References Cited

U.S. PATENT DOCUMENTS

| | | | |
|---|---|---|---|
| 5,123,082 | 6/1992 | Shimada | 395/102 |
| 5,239,313 | 8/1993 | Marko et al. | 347/132 |
| 5,289,564 | 2/1994 | Morimoto et al. | 395/109 |
| 5,548,690 | 8/1996 | Shimada | 395/112 |
| 5,615,310 * | 3/1997 | Kim | 395/102 |
| 5,634,090 * | 5/1997 | Nurukawa et al. | 395/115 |
| 5,687,296 * | 11/1997 | Shimada | 395/102 |
| 5,696,888 * | 12/1997 | Ikeda | 395/102 |

* cited by examiner

Primary Examiner—Arthur G. Evans
(74) Attorney, Agent, or Firm—Robert E. Bushnell, Esq.

(57) ABSTRACT

A laser printer and printing method for obtaining high quality of a picture by using different DPIs between a printer engine and data for printing, which includes a PC interface unit for receiving rasterized data from a PC connected to a printer; a band memory for storing the data transmitted from the PC interface unit; a main controller for reading and transmitting the data stored in the band memory; a clock generating unit for generating a clock for transmitting the data; a line buffer memory for temporarily storing the read data; and a line buffer control unit for controlling the line buffer. A printing method includes receiving data from the PC and storing the data in a band memory, comparing the DPI of data with that of the printer engine, and transmitting the data at least once to the printer engine for the time corresponding to the predetermined number of the clock. As a result, the problem caused by the difference of DPI between data and the printer engine is eliminated in order to ensure the high quality of an image, such as when printed by a laser printer using the same DPI.

14 Claims, 6 Drawing Sheets

LASER PRINTER CAPABLE OF AND METHOD FOR PRINTING RASTERIZED DATA OF HIGH IMAGE QUALITY

CLAIM FOR PRIORITY

This application makes reference to, incorporates the same herein, and claims all benefits accruing under 35 U.S.C. §119 from an application for A PRINTER AND PRINTING METHOD FOR RASTERIZED DATA HAVING HIGH QUALITY OF PICTURE earlier filed in the Korean Industrial Property Office on the 19th of Sep. 1996, and there duly assigned Ser. No. 40892/1996, a copy of which application is annexed hereto.

BACKGROUND OF THE INVENTION

1. Technical Field

The present invention relates to a laser printer of printing rasterized data of high quality of picture using a graphic descriptive interpretation (GDI), and particularly to a laser printer capable of adjusting the difference of a resolution density (i.e., a number of dots per inch "DPI") of data received from a host computer and a resolution density of a printer engine.

2. Related Art

Generally, a graphic descriptive interpretation (GDI) method requires a personal computer (PC) to rasterize image data for printing purposes and then transmit the rasterized image data to a printer for printing according to the rasterized image data. In contrast to most contemporary printing methods which require many memory devices, highly efficient processors, font storing memories and video controllers including data decoding program, etc., the GDI method requires the personal computer (PC) to process image data and then transmit the image data to the video controller of the printer which serves only as a buffer for subsequent printing purposes.

The rasterized image processing at the personal computer (PC) is a technique which forms an image in terms of a graphic mode. First, an image is regarded as a collection of small dots, and is formed by the shading and coloring of each dot. Using this technique, as everything else is displayed on the screen by means of dots, the density resolution is determined according to the size and number of dots per unit length. For example, when rasterized data having a density resolution of 300 DPI (Dot Per Inch) in the personal computer using the GDI technique is transmitted to the printer engine of a printer, the quality of image is poor, as the printer engine prints image data having 600 DPI if the printer engine has a density resolution above 600 DPI. That is, only half of image data is printed in a horizontal direction (i.e., scanning direction), and the other half of image data is printed in a vertical direction (i.e., paper driving direction). As a result, only the area of one fourth (¼) of image data is printed. In order to solve this problem, the printing of image data in the horizontal direction is performed by reducing a video frequency to a half (½), and the printing of image data in the vertical direction is performed at every other line. This way, the printing area can be restored to the former state. However, the resolution density of an image is low due to the difference of a dot density (i.e., dots per inch) of image data for printing and a dot density of the printer engine.

Contemporary efforts for laser type printer to print image data in different resolution density are disclosed in U.S. Pat. No. 5,123,082 for Image Information Recorder Having A Resolution Density Transformation Device issued to Shimada, U.S. Pat. No. 5,239,313 for Continuously Variable Resolution Laser Printer issued to Marko et al., U.S. Pat. No. 5,289,564 for Image Recording Apparatus For Providing High Quality Image issued to Morimoto et al., and U.S. Pat. No. 5,548,690 for Printing Apparatus issued to Shimada. For example, Shimada '082 discloses a laser beam printer with a resolution density transformation device for transforming image data of one resolution density into another resolution density that is used by the laser beam printer. Similarly, Morimoto et al. '564 discloses a laser beam printer having conversion capability for converting image data received from a host computer from one resolution density into another resolution density that is used by the laser beam printer. Likewise, Shimada '690 uses an interpolation technique to control the resolution density of image data for printing purposes. Marko '313 discloses a laser beam printer having continuously selectable printing resolutions by changing, however, various combinations of laser spot size, paper motion speed, video data rate, and scanner speed. As I have observed, however, a simpler technique for overcoming the difference between the resolution density of image data received from a host computer and the resolution density used by the laser beam printer for high quality image is still needed.

SUMMARY OF THE INVENTION

Accordingly, it is therefore an object of the present invention to provide a laser beam printer of a simplified structure for printing high quality image of different resolutions.

It is also an object to provide a printer capable of printing high quality image by using different dot resolutions (i.e., dots per inch "DPI") between image data received from a host computer and a printer engine.

These and other objects of the present invention can be achieved by a printer for printing a rasterized image includes a PC interface unit for receiving rasterized data from a PC connected to a printer; a band memory for storing the data transmitted from the PC interface unit, a main controller for reading and transmitting the data stored in the band memory, a clock generating unit for generating clock for transmitting the data, a line buffer memory for temporarily storing the read data, and a line buffer control unit for controlling the line buffer. A printing technique includes receiving data from the PC and storing the data in a band memory, comparing the DPI of data with that of the printer engine, and transmitting the data at least once to the printer engine for the time corresponding to the predetermined number of the clocks.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
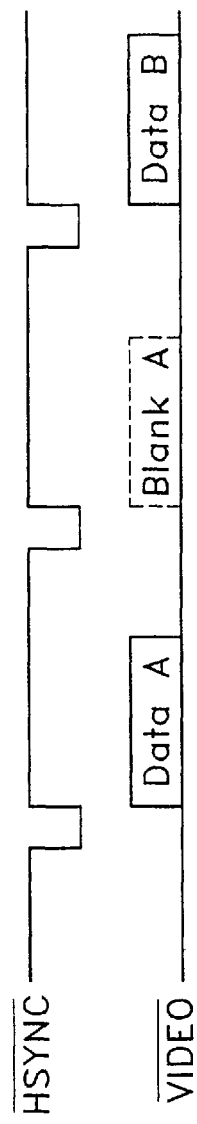
FIG. 1 is a timing chart of a contemporary transmission method of rasterized data.

Referring now to the drawings and particularly to FIG. 1, which illustrates a timing chart of a contemporary transmission method of rasterized data. As shown in FIG. 1, /HSYNC represents a waveform of a horizontal synchronization signal, and /VIDEO represents a period for transmitting image data to a printer engine in accordance with the horizontal synchronization signal /HSYNC. Data A and B indicate data of one line which are transmitted to the printer engine of a printer according to the video period /VIDEO, and a blank A indicates that image data is not transmitted when the horizontal synchronization signal /HSYNC is at a second edge in order to solve the reduction of a print area caused by the difference of a dot density in terms of a number of dots per inch between the image data received from a host computer such as a personal computer (PC) and the printer engine of the printer connected to the PC. However, in the conventional printer, as every other line is treated as a white color (blank A of FIG. 1), the quality of picture is deteriorated because of its lower density. Moreover, blank areas cannot be expressed exactly.

Figure 2:
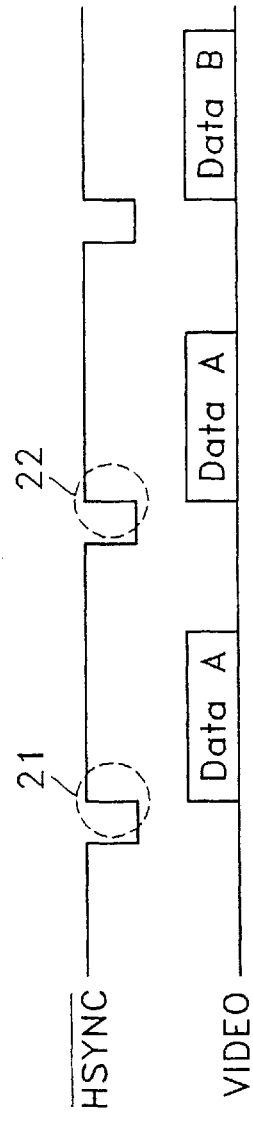
FIG. 2 is a timing chart of a transmission method of rasterized data according to the present invention.

FIG. 2 is a timing chart of a transmission method of rasterized data according to the present invention. As shown in FIG. 2, /HSYNC indicates a horizontal synchronization signal and /VIDEO indicates the period for transmitting data to a printer engine in accordance with the horizontal synchronization signal /HSYNC. Data A and B indicate data of one line transmitted to the printer engine according to the /VIDEO signal. To solve the problem of reduction of the printing area caused by the difference of DPI between image data received from a host computer for printing and the printer engine of the printer, data A is to indicate the re-transmission of data which is transmitted at the time of a first up edge 21 instead of the conventional transmitting method in which the horizontal synchronization signal /HSYNC does not transmit data at the time of a second up edge 22.

Figure 3:
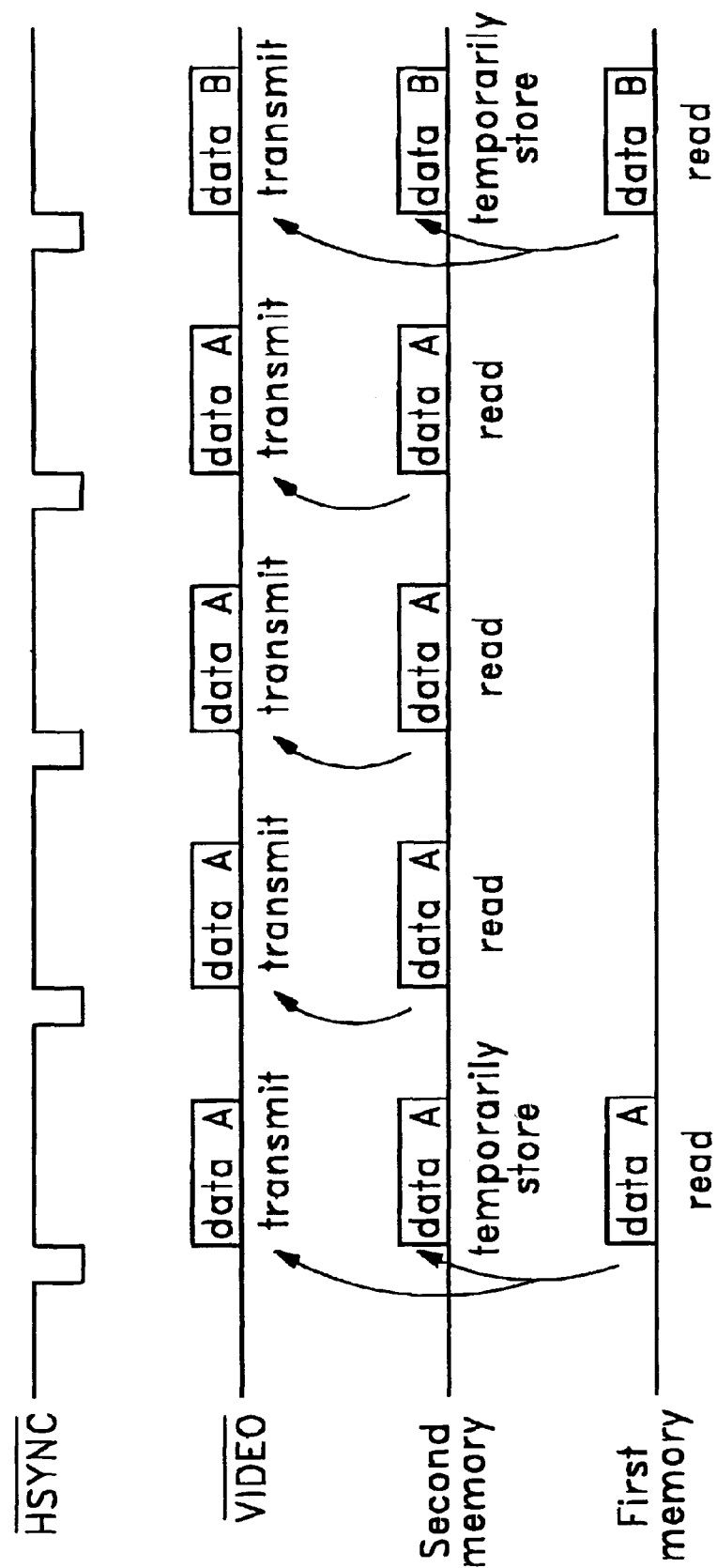
FIG. 3 is a timing chart illustrating an embodiment when n is 4 to explain FIG. 2.

FIG. 3 is a timing chart illustrating an embodiment when "n" is 4 to further explain the timing chart of FIG. 2. That is, as a result of the comparison of the DPI of the input image data A and the DPI of the printer engine, in the case that both DPIs are same, the data A corresponding to one line is successively transmitted to the printer engine of the printer in accordance with the horizontal synchronization signal for printing purposes.

In the case that the DPI of the image data A is 1/n (here, n=4) of the DPI of the printer engine as a result of the comparison, image data A corresponding to one line is read from the first memory in accordance with the first horizontal synchronization signal and it is transmitted to the printer engine. At the same time, the image data A corresponding to one line read from the first memory is temporarily stored in the second memory. After that, the image data A corresponding to one line stored in the second memory according to signals after the second horizontal synchronization signal is transmitted to the printer engine as many as n−1 times (3 times) in accordance with the horizontal synchronization signal.

Figure 4:
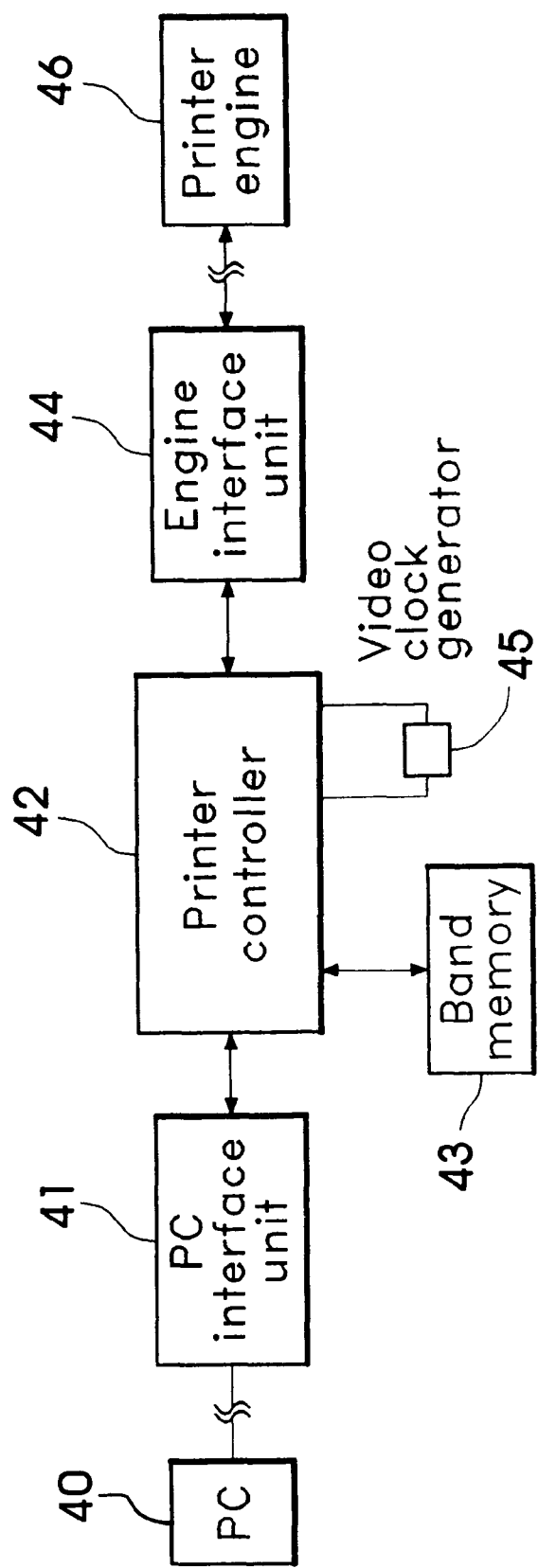
FIG. 4 is a block diagram of a laser printer for printing rasterized image of high quality image according to the principles of the present invention.

Turning now to FIG. 4 which illustrates a laser beam printer with a data processing apparatus for rasterized image constructed according to the principles of the present invention. As shown in FIG. 4, the printer includes a PC interface unit 41 connected to a PC 40, a printer controller 42, a band memory 43, an engine interface unit 44, a video clock generator 45, and a printer engine 46.

Printer controller 42 controls transmission of image data received from the PC 40 to the printer engine 46 and transmission of information of the printer engine 46 to the PC 40. In addition, the printer controller 42 controls operation of each component and the flow of the rasterized data. The band memory 43 stores the rasterized data of the PC 40 for compensating the difference between input speed of the rasterized data of the PC 40 and transmission speed of the printer engine 46. The engine interface unit 44 exchanges information with the printer engine 46, and the video clock generator 45 generates a clock to control the transmission of the video data in accordance with the video data processing speed of the printer engine 46.

Figure 5:
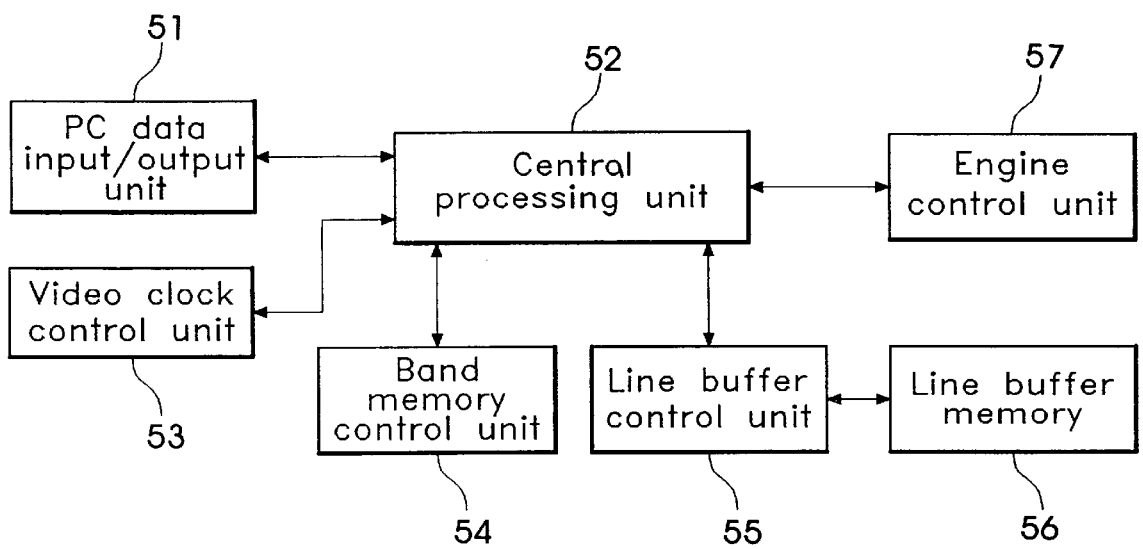
FIG. 5 is a block diagram of a printer controller of the laser printer constructed according to the principles of the present invention.

FIG. 5 illustrates the printer controller of the printer according to the present invention. As shown in FIG. 5, the printer controller includes a PC data input/output unit 51, a central processing unit (CPU) 52, a video clock control unit 53, a band memory control unit 54, a line buffer control unit 55, a line buffer memory 56 and an engine control unit 57. The PC data input/output unit 51 recognizes the type of information received from the PC 40, inputs the control command, status confirmation, and rasterized data to the CPU 52 through a predetermined conversion process, and transmits the output of the CPU 52 to the PC 40 after a predetermined conversion process. The CPU 52 controls the flow of rasterized data and manages operation of each component to perform smoothly without conflict. The video clock control unit 53 controls the input video clock and provides the clock after converting into frequency clock suitable to each component. The band memory control unit 54 stores or reads the read/registration signal input from the CPU 52 in the band memory 43, and transmits a control signal in accordance with the time required by the band memory 43. The line buffer control unit 55 stores or reads the read/registration signal input from the CPU 52 in a line buffer memory 56 and transmits the control signal in accordance with the time required by a line buffer memory 56. The line buffer memory 56 stores an amount of one line of the rasterized data transmitted from the engine control unit 57 and transmits the stored amount to the printer engine in the next line. The engine control unit 57 recognizes the type of information data received from the PC 40, transmits a control command to the printer engine 46 in the case of a control command and transmits a status confirmation result in the case of the status confirmation, and forms and transmits video data suitable to a predetermined video clock received from the video clock control unit 53 in accordance with each synchronization signal inputted from the printer engine 46 in the case of the rasterized data.

Figure 6:
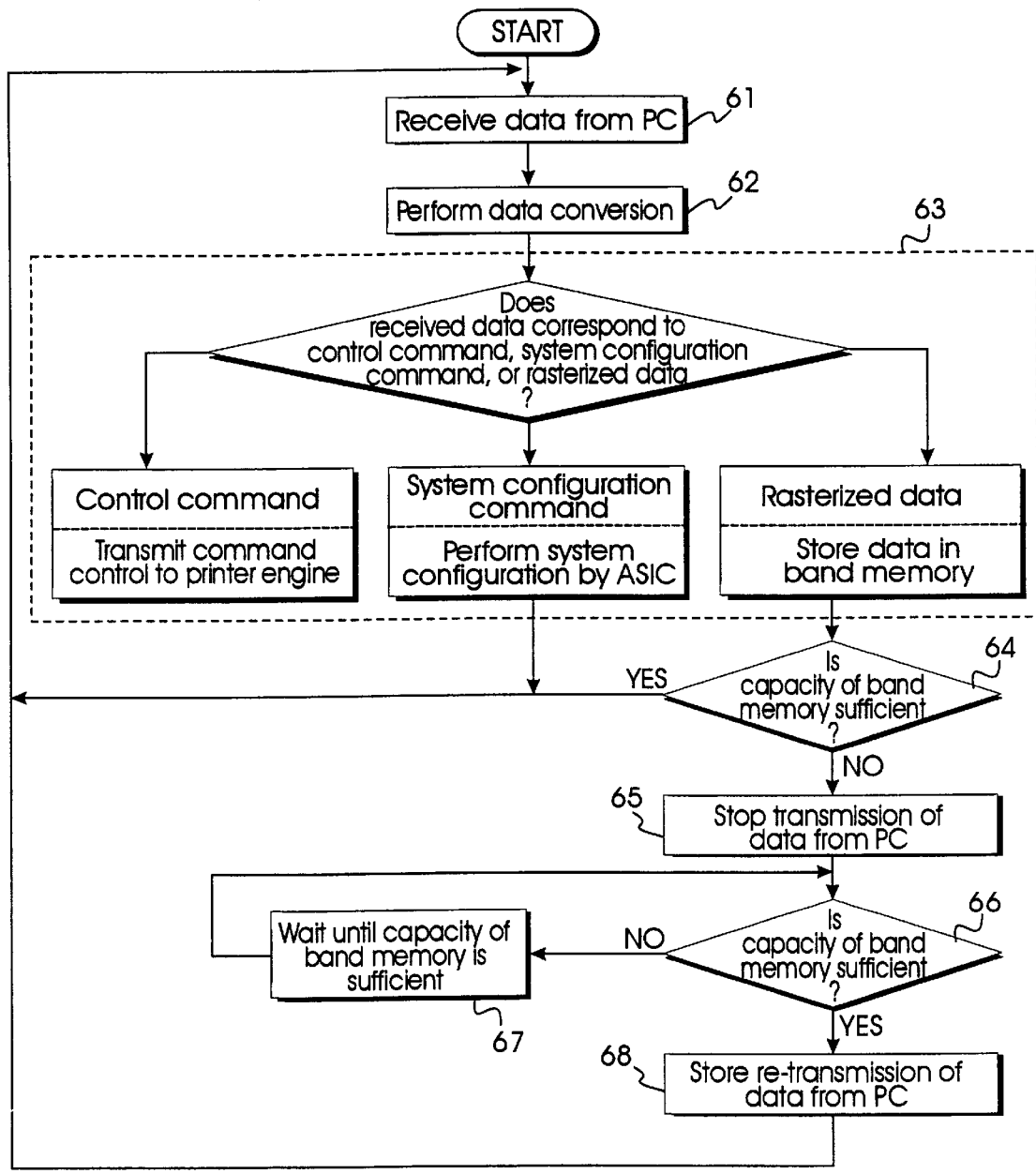
FIG. 6 is a flowchart illustrating a process of receiving image data from a personal computer (PC)

Refer now to FIG. 6 which illustrates a control process of receiving image data from the PC 40. As shown in FIG. 6, the control process includes receiving rasterized data from the PC 40 (as shown in FIG. 4), performing a data conversion of the image data received from PC 40 in accordance with a printer system, storing the image data in the band memory 43, determining whether the capacity of the band memory 43 is insufficient, temporarily stopping the transmission of rasterized data from the PC 40 in accordance with the result of the determination, determining the status of the band memory 43, and indicating the operation of re-transmission of the image data from the PC 40 in accordance with the result of the determination.

Figure 7:
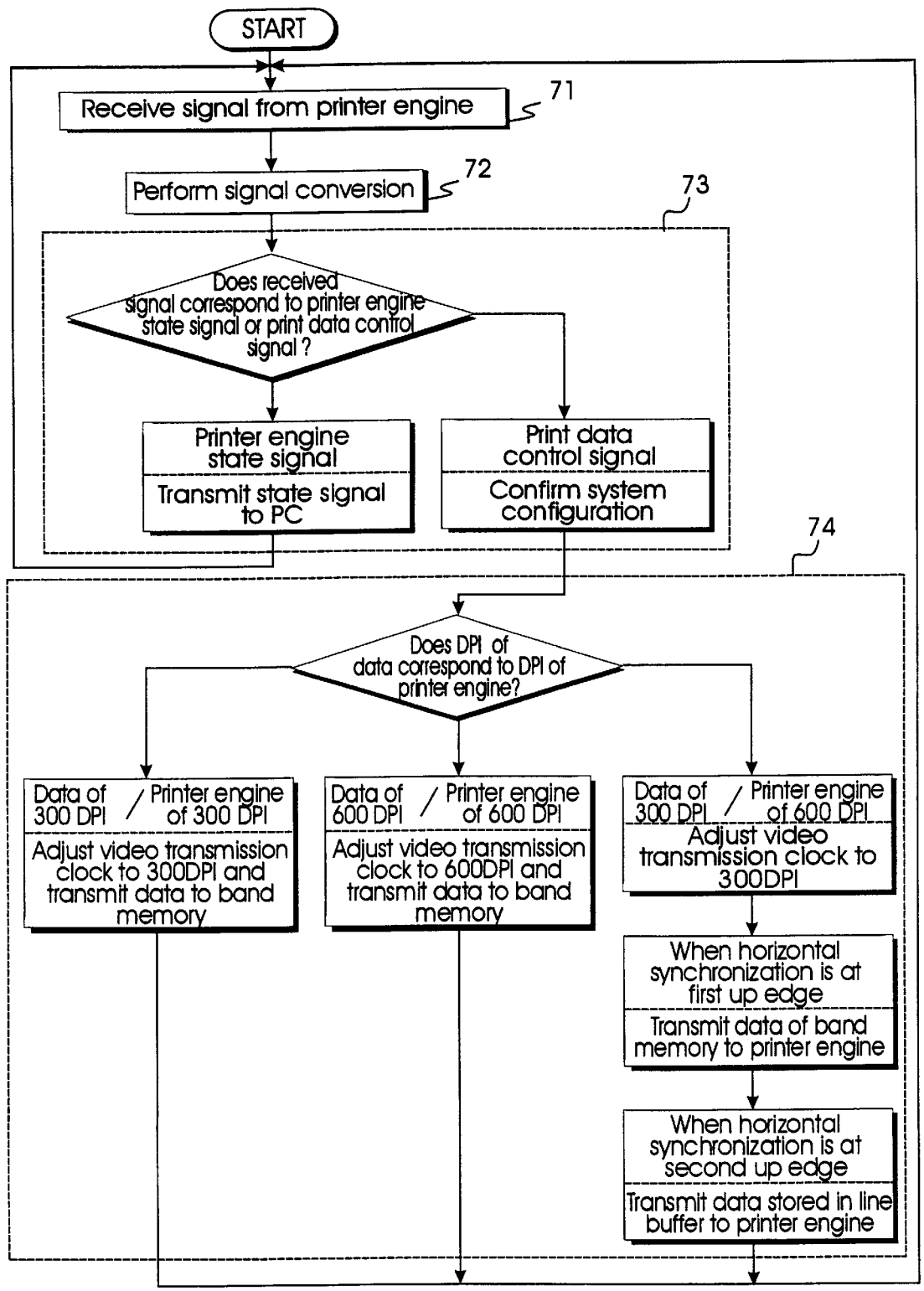
FIG. 7 is a flowchart illustrating a process of transmitting image data to a printer engine from a band memory according to the principles of the present invention.

FIG. 7 illustrates a control process of transmitting image data to a printer engine 46 from a band memory 43 according to the principles of the present invention, FIG. 7 referring to a printer engine 46 having a dot density of one of 300 DPI and 600 DPI, for example. As shown in FIG. 7, the control process includes receiving each signal from the printer engine 46 and converting the signal into data, reading the data from the band memory 43, determining the DPI of the rasterized data stored in the band memory 43 and that of the printer engine 46, transmitting the image data to the printer engine 46 in the case that the both DPIs are the same as a result of the determination, transmitting the image data when a horizontal synchronization signal is at a first up edge 21 (as shown in FIG. 2) and storing the data in the line buffer memory 56 in the case that the both DPIs are not the same, and reading the data stored temporarily in the line buffer memory 56 and transmitting the data to the printer engine 46 when the horizontal synchronization signal is at a second up edge 22 (as shown in FIG. 2).

Now, the process of receiving the rasterized data from the PC 40 and the process of transmitting the rasterized data to the printer engine 46 of a laser beam printer according to the principles of the present invention will now be described in detail with reference to FIGS. 4 to 7 hereinbelow.

First, when image data is received from the PC 40, the printer controller 42 stores the image data in band memory 43 through a series of steps. At step 61, the printer controller 42 receives the image data from the PC 40. After receipt of the image data from the PC 40, the printer controller 42 performs a data conversion of the image data into a predetermined form which the printer provides at step 62. After that, the printer controller 42 determines whether the received data corresponds to one of a control command, a system configuration command, or rasterized data.

When the received data corresponds to a control command, the control command is transmitted to the printer engine control unit 57. Alternatively, when the received data corresponds to a system configuration command, the system configuration is performed by an ASIC (Application-Specific IC) inside of the printer. However, if the received data corresponds to the rasterized data, the rasterized data is stored in the band memory 43 at step 63 (as shown in FIG. 6). After the rasterized data is stored in the band memory 43, the printer controller 42 determines whether the capacity of the band memory 43 is insufficient at step 64. When the capacity of the band memory 43 is not insufficient, the printer controller 42 returns to step 61 to receive the data from the PC. When the capacity of the band memory 43 is insufficient, however, the printer controller 42 controls the temporary stop of transmission of data from the PC 40 at step 65. After stopping the data transmission from the PC 40, the data stored in the band memory 43 is continuously output to the printer engine 46. Next, the printer controller 42 determines whether the capacity of the band memory 43 is sufficient to store the data transmitted from the PC 40 at step 66 and, if not, the process proceeds to step 67. When the capacity of the band memory 43 is sufficient at step 66, the printer controller 42 asks for the re-transmission of data from the PC 40 at step 68. After that, step 61 is repeated to receive data from the PC 40.

After the rasterized data is stored in band memory 43 by a series of steps as shown in FIG. 6, the printer controller 42 performs a process for transmitting the rasterized data to the engine control unit 57 through a series of steps described as follows. First, the printer controller 42 receives a signal from the printer engine 46 at step 71. The printer controller 42 then controls the engine control unit 57 to perform a signal conversion at step 72. After that, the printer controller 42 determines whether the data corresponds to one of a printer engine state signal or a print data control signal. As a result of the determination, when the data is a signal of the printer engine state, the state signal is transmitted to the PC 40. On the contrary, when the data is a print data control signal, a system configuration including DPI of the printer is confirmed for transmitting the rasterized data to the printer engine 46 at step 73.

After confirming the DPI of the printer engine, the DPI of the image data to be transmitted and that of the printer engine are compared at step 74. In the case that the data has 300 DPI and the printer engine has 300 DPI, the image data of the band memory 43 is transmitted after the video transmission clock is adjusted to 300 DPI. When the image data has 600 DPI and the printer engine has 600 DPI, the image data of band memory 43 is transmitted after the video transmission clock is adjusted to 600 DPI. In the case that the data has 300 DPI and the printer engine has 600 DPI, after the video transmission clock is adjusted to a 300 DPI, the data (data A of FIG. 2) is transmitted to the printer engine 46 when the horizontal synchronization signal /HSYNC is at a first up edge 21 (as shown in FIG. 2). Here, the data transmitted from the band memory 43 are successively stored in the line buffer memory 56 (as shown in FIG. 5) according to the control of the line buffer control unit 55. After storing the data (data A of FIG. 2) successively in the line buffer memory 56, when a second horizontal synchronization signal /HSYNC is at a second up edge 22, the data (data A of FIG. 2) stored in the line buffer memory 56 according to a control of the line buffer control unit 55 are successively read and they are converted into video data through the engine control unit 57. The video data are transmitted to the printer engine 46 through the engine interface unit 44 at step 74. After transmitting data of one line, step 71 is repeated to receive another signal from the printer engine 46.

As described above, since the problem caused by the difference of DPI between the image data received from the host computer and the DPI of the printer engine is resolved, high quality of an image can be assured when printed by a laser printer using the same DPI.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A printer having input means for receiving rasterized data from a host computer and output means for transmitting the input rasterized data to a printer engine, comprising:

a first memory for storing the data received from said input means;

a second memory for temporarily storing the data read from said first memory;

means for comparing a dot density of the data with a dot density of said printer engine; and video data generating means which successively reads the data corresponding to one line from said first memory in accordance with a horizontal synchronization signal and transmitting the data corresponding to said one line read from said first memory to said printer engine through said output means when the dot density of the data corresponding to said one line is the same as the dot density of said printer engine; and, when the dot density of the data corresponding to said one line is 1/n of the dot density of the printer engine, said video data generating means transmitting data corresponding to said one line to the printer engine through said output means by reading the data corresponding to said one line from said first memory in accordance with a first horizontal synchronization signal and also temporarily storing the data corresponding to said one line read from said first memory in said second memory, and then reading the data corresponding to said one line temporarily stored in said second memory and then successively transmitting the data corresponding to said one line temporarily stored in the second memory n−1 times to said printer engine through said output means, each of said n−1 times for successively transmitting the data corresponding to said one line being in accordance with a corresponding successive horizontal synchronization signal following said first horizontal synchronization signal, "n" being a positive integer.

2. The printer of claim 1, further comprised of said dot density of said data corresponding to one of 300 dots per inch and 600 dots per inch.

3. The printer of claim 1, further comprised of said dot density of said printer engine corresponding to one of 300 dots per inch or 600 dots per inch.

4. A method for printing rasterized image data of high quality in a printer using a printer engine, comprising:

receiving image data from a host computer and storing the image data in a first memory;

comparing a dot density of the image data received from the host computer with a dot density of said printer engine;

transmitting the image data corresponding to one line to said printer engine in accordance with a horizontal synchronization signal, when the dot density of the image data corresponding to said one line is the same as the dot density of said printer engine; and successively transmitting the image data corresponding to said one line "n" number of times to said printer engine in accordance with corresponding successive horizontal synchronization signals of "n" in number, when the dot density of the image data corresponding to said one line is 1/n of the dot density of said printer engine, "n" being a positive integer.

5. The method of claim 4, further comprised of said successively transmitting step comprising:

transmitting the image data corresponding to said one line to said printer engine a first time of said "n" number of times after reading the image data corresponding to said one line from said first memory in accordance with a first one of said horizontal synchronization signals;

temporary storing the image data corresponding to said one line read from said first memory in a second memory during transmission of the image data corresponding to said one line in accordance with said first one of said horizontal synchronization signals; and successively transmitting the image data corresponding to said one line stored in said second memory n−1 times in accordance with a corresponding successive one of said horizontal synchronization signals following said first one of said horizontal synchronization signals.

6. A printer, comprising:

means for receiving rasterized image data from a host computer;

a printer engine;

a first memory for storing the image data received from the host computer;

a second memory for temporary storing the image data read from said first memory;

means for comparing a dot density of the image data with a dot density of said printer engine; and a printer controller controlling transmission of the image data corresponding to one line to said printer engine for printing on a recording medium in response to receipt of a first clock when the dot density of the image data corresponding to said one line and the dot density of said printer engine are the same; and, when the dot density of the image data corresponding to said one line and the dot density of the printer engine are different, said printer controller controlling transmission of the image data corresponding to said one line from said first memory to said printer engine for printing on said recording medium and controlling temporarily storing the image data corresponding to said one line read from said first memory in said second memory in response to receipt of said first clock and controlling successively transmitting at least once the image data corresponding to said one line read from said second memory to said printer engine in response to receipt of at least a second clock following said first clock of a predetermined number of successive clocks.

7. The printer of claim 1, further comprised of said dot density of said data corresponding to one of 300 dots per inch and 600 dots per inch, and said dot density of said printer engine corresponding to one of 300 dots per inch or 600 dots per inch.

8. The printer of claim 1, further comprised of said dot density of said data being in dots per inch and said dot density of said printer engine being in dots per inch.

9. The method of claim 4, further comprised of said dot density of said image data being in dots per inch and said dot density of said printer engine being in dots per inch.

10. The method of claim 4, further comprised of said dot density of said image data corresponding to one of 300 dots per inch and 600 dots per inch, and said dot density of said printer engine corresponding to one of 300 dots per inch or 600 dots per inch.

11. The method of claim 5, further comprised of said dot density of said image data being in dots per inch and said dot density of said printer engine being in dots per inch.

12. The method of claim 5, further comprised of said dot density of said image data corresponding to one of 300 dots per inch and 600 dots per inch, and said dot density of said printer engine corresponding to one of 300 dots per inch or 600 dots per inch.

13. The printer of claim 6, further comprised of said dot density of said image data being in dots per inch and said dot density of said printer engine being in dots per inch.

14. The printer of claim 6, further comprised of said dot density of said image data corresponding to one of 300 dots per inch and 600 dots per inch, and said dot density of said printer engine corresponding to one of 300 dots per inch or 600 dots per inch.

* * * * *